United States Patent [19]

d'Alayer de Costemore d'Arc

[11] Patent Number: 4,595,962
[45] Date of Patent: Jun. 17, 1986

[54] ADAPTER FOR VIDEO CASSETTE

[75] Inventor: Stephane M. d'Alayer de Costemore d'Arc, Ways, Belgium

[73] Assignee: Staar S.A., Brussels, Belgium

[21] Appl. No.: 424,556

[22] Filed: Sep. 27, 1982

[30] Foreign Application Priority Data

Dec. 1, 1981 [BE] Belgium ............................ 891 313

[51] Int. Cl.⁴ ............... G11B 5/008; G11B 15/00;
G11B 17/00; G03B 1/04
[52] U.S. Cl. ...................................... 360/94; 360/85;
360/95; 242/199
[58] Field of Search ............. 360/95, 93, 94, 96.5,
360/132, 85; 242/197, 198, 199, 200, 180

[56] References Cited

U.S. PATENT DOCUMENTS

| 3,632,894 | 1/1972 | Bretschneider | 360/94 |
| 3,864,742 | 2/1975 | Katoh | 360/85 |
| 3,964,099 | 6/1976 | Sato | 360/94 |
| 4,470,560 | 9/1984 | Yoneya et al. | 360/94 |
| 4,477,850 | 10/1984 | Ogata et al. | 360/94 |

FOREIGN PATENT DOCUMENTS

| 891249 | 3/1982 | Belgium . | |
| 891250 | 3/1982 | Belgium . | |
| 52-76912 | 6/1977 | Japan | 360/95 |
| 55-45172 | 3/1980 | Japan | 360/94 |
| 1248289 | 9/1971 | United Kingdom | 360/95 |

Primary Examiner—John H. Wolff
Assistant Examiner—Alfonso Garcia
Attorney, Agent, or Firm—Leydig, Voit & Mayer, Ltd.

[57] ABSTRACT

A video cassette adapter allowing a miniature cassette to be played in conventional video apparatus is disclosed. The adapter has the outer shape and dimensions of a standard, large size video cassette and has a cut-out portion in one face for receiving a miniature cassette having spools and recording tape extending therebetween normally in a small loop. Guide rollers are mounted on pivotable arms movable by a motor in the adapter for forming a large loop of the recording tape of a miniature cassette in the cut-out portion with a section of the large loop extending along a straight elongated path. Hubs are rotatably mounted for access through a face thereof by and for cooperation with spindles of a video apparatus and connected to rotate the miniature cassette spools to transfer recording tape along the path of the large loop.

24 Claims, 12 Drawing Figures

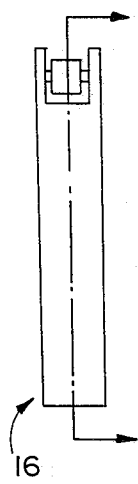
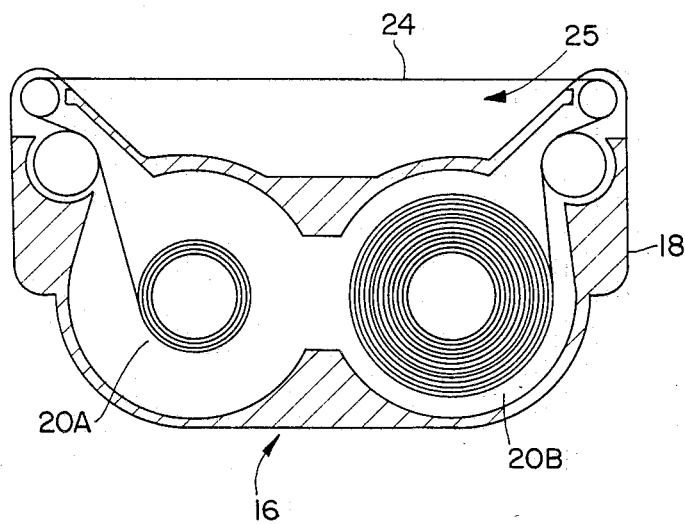
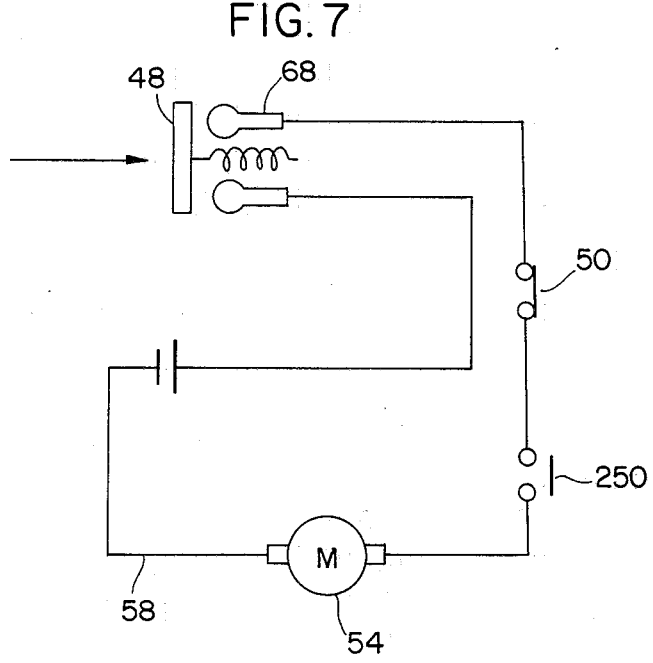

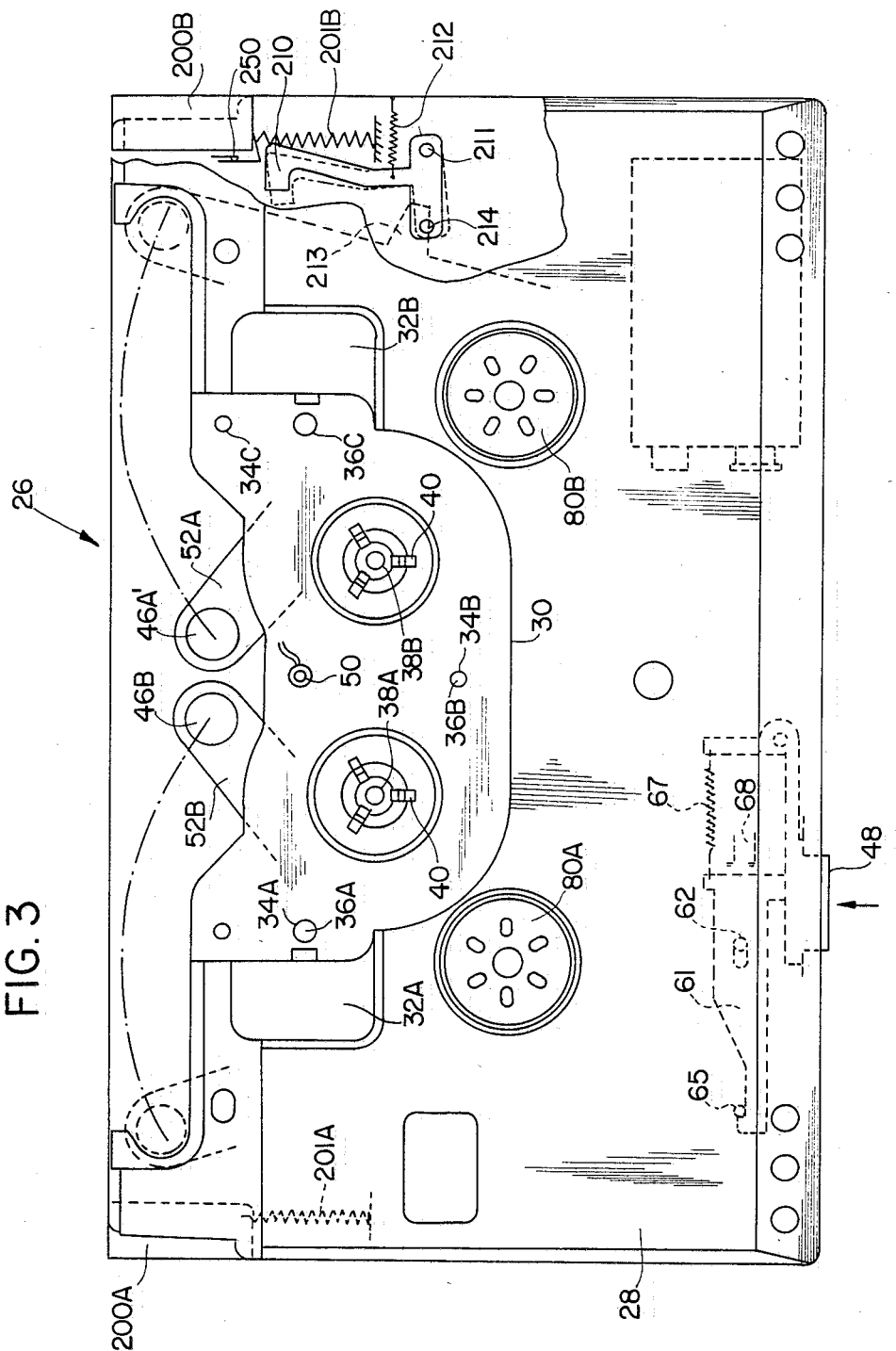

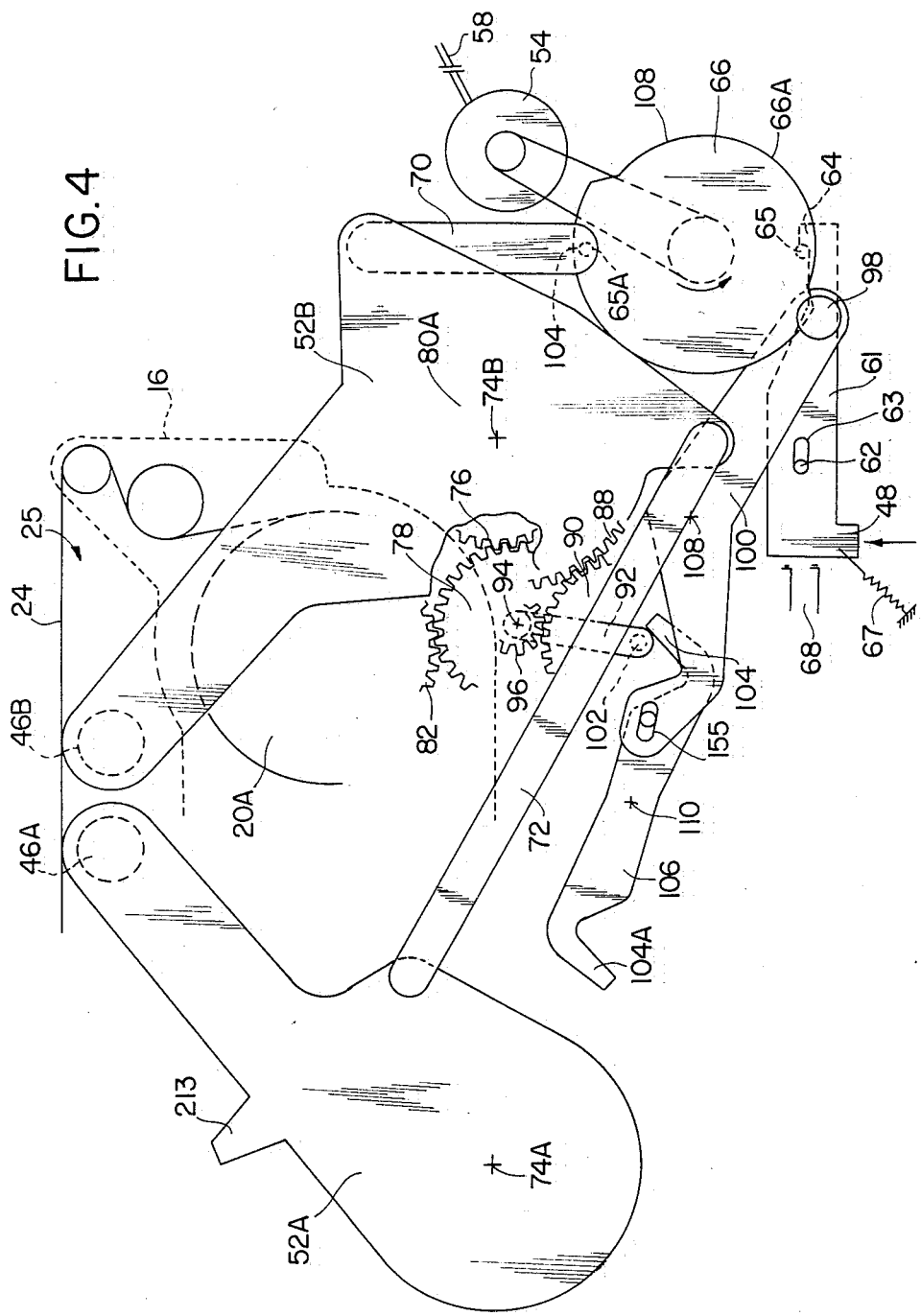

ADAPTER FOR VIDEO CASSETTE

TECHNICAL FIELD

The present invention relates to video apparatus and, more particularly, to video cassettes of magnetic tape for recording and playing video programs.

BACKGROUND ART

The large majority of video recorder/player apparatus presently on the market use large standard video cassettes having recording capacities of several (4 to 6) hours.

Some portable video cameras make video recordings using a recorder which is integrated with the camera and which uses miniature video cassettes. Miniature video cassettes cannot be played in most video recorder/player apparatus, however, and recordings made thereon must be re-recorded on tape of a standard video cassette in order to be used in such apparatus.

The magnetic tape in standard video cassettes follows a well-defined path as it must cooperate with drive, reproduction and/or recording members. As a general rule, a portion of the path is straight and elongated and extends adjacent one longer edge of the video cassette to ensure that the tape is exposed over practically the entire length of the cassette so as to enable a loading device to remove the tape from the cassette and place it against the recording and playback members when the cassette is in the operative position.

Since, by their very nature, miniature video cassettes are very much smaller than standard video cassettes, the magnetic tape which they contain does not have the same path arrangement as in the standard video cassette, as a result of which they cannot be used in most video recorder/player apparatus.

Portable recorders using miniature video cassettes, accordingly, have not come into widespread use owing to the incompatibility of the miniature video cassettes with video apparatus intended for use with standard video cassettes.

DISCLOSURE OF THE INVENTION

The principal object of the present invention is to overcome these disadvantages encountered in the use of miniature video cassettes by providing an adapter of the same dimensions and shape as a large standard video cassette and in which a miniature video cassette can be inserted and then can be played using conventional video recorder/player apparatus.

Another object is to provide such an adapter which is capable of cooperating with the magnetic tape contained in the miniature video cassette so as to cause it to follow the same path as in a standard video cassette once the miniature video cassette is correctly positioned in the adapter.

A further object is to provide such an adapter in which the tape is automatically retracted into the miniature video cassette before its removal from the adapter.

Another object is to provide such an adapter in which safety features are included to prevent damage to the tape of the miniature video cassette upon use of the adapter in video apparatus.

BRIEF DESCRIPTION OF THE DRAWINGS

Other features and advantages of the invention will become apparent from the following detailed description of a preferred embodiment, with reference to the drawings, in which:

FIGS. 2 and 2A illustrate a miniature video cassette for the adapter of this invention;

FIG. 3 is a simplified plan view of the adapter of this invention with a miniature video cassette received in the adapter housing;

FIG. 4 is a fragmentary detail view of a portion of the adapter mechanism with the arms and guide means in a retracted position looking at the opposite face of the adapter;

FIG. 7 is a simplified schematic diagram of the control circuit of the adapter.

BEST MODE FOR CARRYING OUT THE INVENTION

Figure 1A:
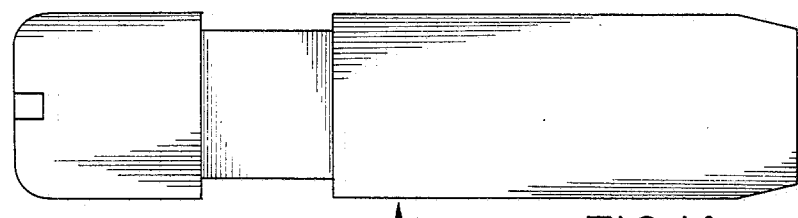
FIGS. 1 and 1A illustrate a large standard video cassette designed for conventional video recorder/player apparatus.
Figure 1:
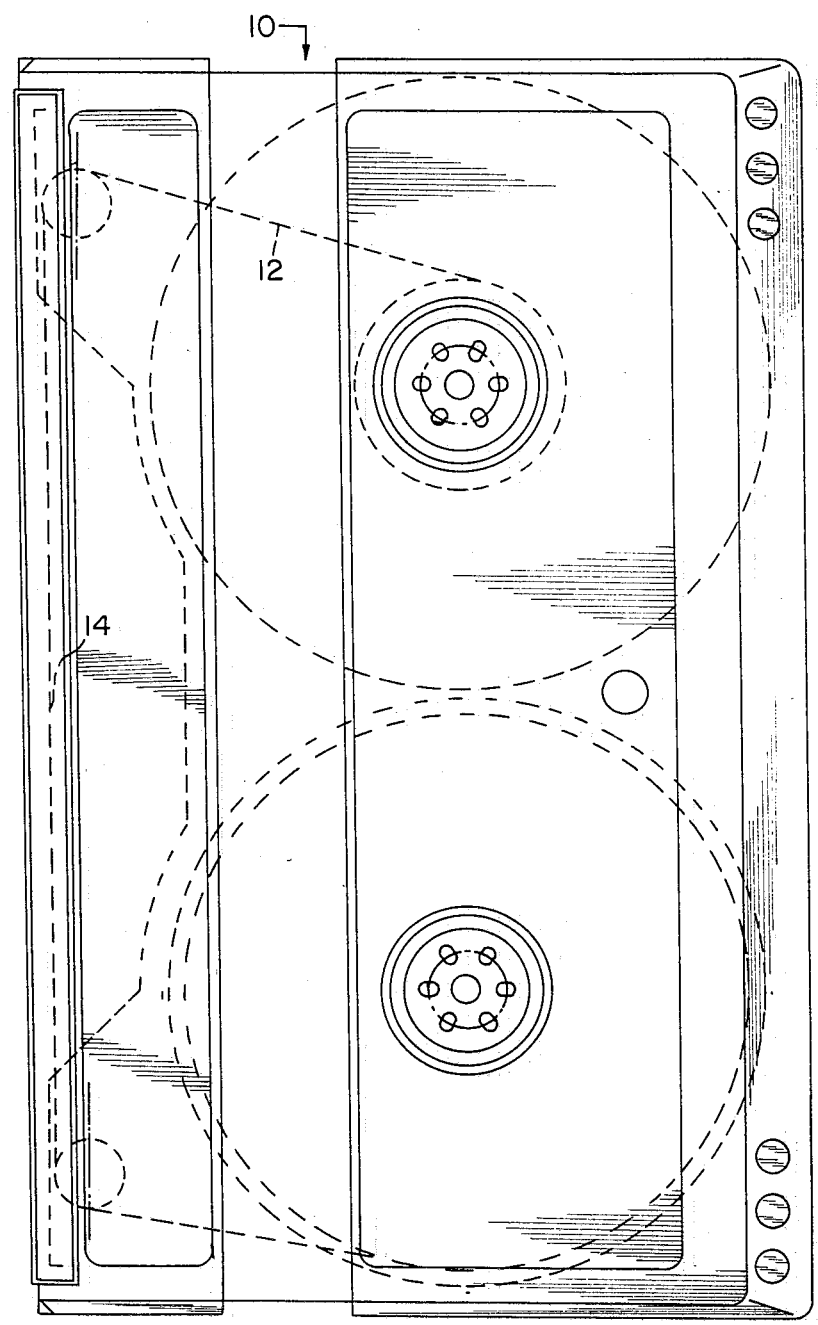

Turning to FIG. 1, this illustrates a large standard video cassette 10 and shows the path of the tape 12 within the cassette. The shape of a standard video cassette 10 is flat and rectangular with the tape extending in a straight elongated path 14 along one longer edge.

A miniature video cassette 16 is shown in FIGS. 2 and 2A for storing a smaller quantity of tape than the large standard video cassette, for example, for recording one-half hour of video as compared with six to eight hours on a standard video cassette 10. This miniature video cassette 16 is described in more detail in commonly assigned U.S. Pat. No. 4,529,149and is particularly suited for use in the adapter of this invention. This miniature video cassette 16 includes a housing 18 and a pair of spools 20A, 20B containing tape 24 which extends between the spools normally in a small loop 25, the spools 20A, 20B having conventional hubs adapted to be driven by drive spindles.

Referring to FIG. 3, an adapter 26 according to this invention is shown which has a housing 28 with external dimensions substantially identical to the dimensions of a standard large video cassette as illustrated in FIGS. 1 and 1A. In order to receive a miniature video cassette 16 of the type shown in FIG. 2, the housing 28 is provided with a cavity 30 in one face of the housing, conforming to the outer shape of the miniature video cassette 16 so that the miniature video cassette may be slipped into and held in the cavity 30. To facilitate insertion and removal, the face of the housing 28 is provided with a pair of opposed shallow finger-sized recesses 32A, 32B into which the user can insert his thumb and forefinger to take hold of the miniature video cassette 16 to remove it from the adapter 26.

Figure 6:
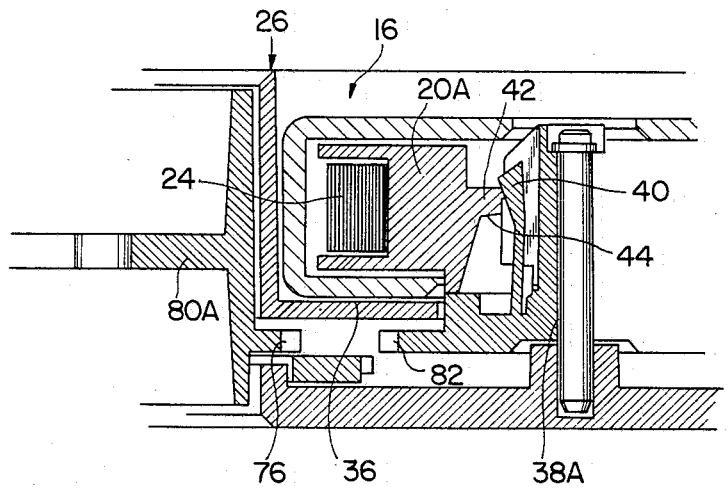
FIGS. 6, 6A, 6B and 6C illustrate the drive connection between the spools of the miniature video cassette and the hubs of the adapter.

To locate the miniature video cassette 16 precisely within the cavity 30, locating studs 34A, 34B, 34C are mounted on the bottom wall 36 (FIG. 6) of the housing 28 which defines the bottom of the cavity 30. The miniature video cassette 16 is provided with openings 36A, 36B, 36C which receive the locating studs to fix the location of the miniature video cassette as it is inserted in the cavity 30 of the adapter housing 28. To insure that the miniature video cassette can be inserted in only one orientation, the locating studs 34A, 34B, 34C may be asymmetrically located or sized and the openings 36A, 36B, 36C similarly located or sized to receive the studs in only one orientation of the miniature video cassette.

Figure 6A:
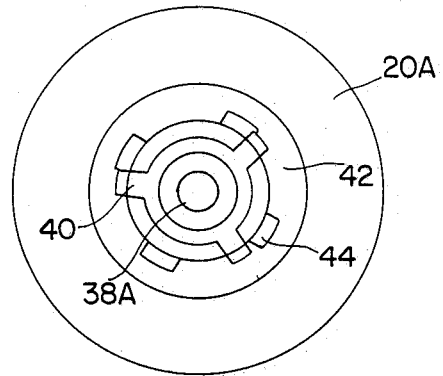
Figure 6B:
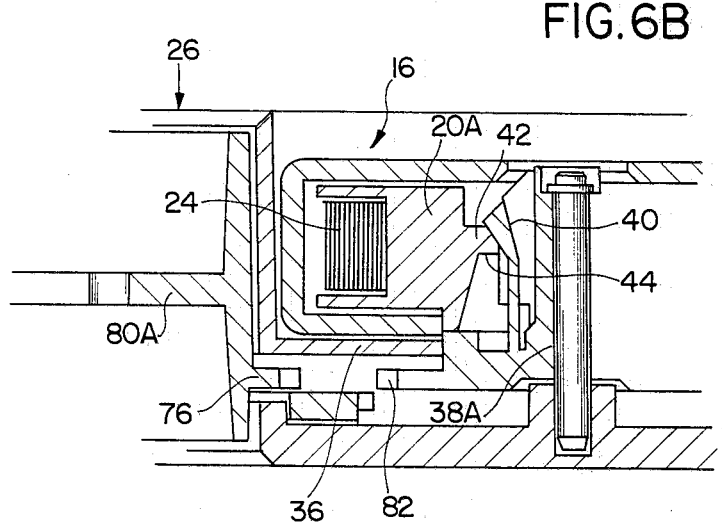
Figure 6C:
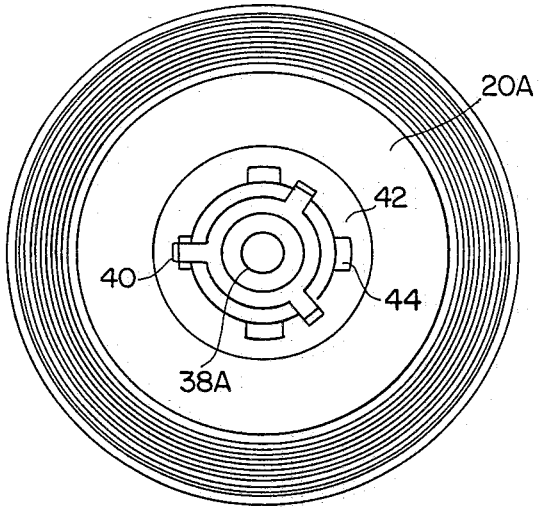

Placing the Miniature Cassette In Operative Position:

The miniature cassette 16 is first positioned by the user in the cut-out portion 30 provided in the adapter housing 28. In carrying out the invention, the adapter 26 is provided with drive spindles 38A, 38B which enter openings in the spools 20A, 20B and the drive spindles 38A, 38B are provided with flexible catches 40 to latch the miniature cassette 16 in the adapter housing 28. In order to cooperate with the flexible catches 40, with which the drive spindles 38A, 38B of the adapter are provided, the central openings in the spools 20A, 20B containing the magnetic tape 24 are provided with a rim 42 (FIGS. 6, 6A) and with axial notches 44 along their internal diameter.

As indicated in FIGS. 10B, 6 and 6A-C, the central opening in each spool 20A of the miniature cassette 16 is provided with four axial notches 44 while the drive spindles 38, 38B of the adapter are provided with three catches 40. When the miniature cassette is positioned in the cut-out portion 30, the three catches 40 of each of the drive spindles thus catch on the internal rim 42 of the spools so as to maintain the said spools at a fixed location. The miniature cassette 16 is pressed against the three studs 34A, 34B, 34C, serving as a reference locating means.

As soon as the drive spindles 38A, 38B are rotated by the video apparatus in which an adapter containing a miniature cassette has been positioned, one of the three catches 40 on each of the drive spindles 38A, 38B is moved into position in one of the four notches 44 so as to drive the spools 20A, 20B.

Responsive to the positioning of the miniature cassette 16 in the cavity 30 of the adapter 28, means are operable to move a guide means 46A, 46B to draw the tape 24 from the miniature cassette 16 and expand the small loop 25 into a large loop 47 of recording tape. Such means may be either manually operated (for example, by a push button switch 48, FIG. 3) or automatically operated as by the switch 50, FIGS. 3 and 7, located at the bottom of the cavity 30 and actuated by the casing of the miniature cassette 16 as it is placed in the cavity 30).

Referring to FIG. 4, in keeping with the invention, the guide means 46A, 46B, herein shown as cylindrical rollers, are carried by a pair of pivotally mounted arms 52A, 52B and the arms and guide means are movable between retracted and extended positions by a motor 54 to engage the guide means with the recording tape 24 of a miniature cassette 16 for drawing the tape from the miniature cassette and forming the large loop 47 of tape 24.

Referring to FIG. 4, it will be seen that the guide means 46A, 46B, when in the retracted position, are located within the small loop 25 of the recording tape 24 in a miniature cassette 16 received in the adapter 26. The arms 52A, 52B and guide means 46A, 46B are movable by the motor 54 from the retracted position to the extended position (see FIG. 5) which causes the large loop 47 of recording tape 24 to be formed. In the large loop 47, the recording tape 24 is trained over the guide means 46A, 46B and guided along the straight, elongated path section 56 of the large loop.

The motor 54 is operated by a circuit 58 (FIG. 7), including the manual switch 48 or automatic switch 50 and a power source. Actuation of the switches by the user causes the circuit 58 to connect power to the motor 54. For example, when the manual push button switch 48 is actuated, it causes plate 61 to pivot about a spindle 62 so that its end 64 escapes a stud 65 on a cam 66. The plate 61 is then subjected to the action of a spring 67, while being guided by the cooperation of the spindle 62 and a cut-out portion 63. At the end of its movement, the plate 61 closes the switch 68 of the supply circuit 58 of the motor 54. The motor is caused to rotate and drive the cam 66 counterclockwise (FIGS. 4, 5) which, via the connecting rods 70 and 72, causes the arms 52A, 52B to rotate about their axes 74A, 74B respectively. During this movement the cylindrical rollers 46A, 46B bring the magnetic tape 24 of the miniature cassette 16 from the path which it occupied in the miniature cassette when it was inserted in the adapter to the large loop 47 including the elongated, straight path section 56 which the tape must occupy in a normal cassette. A half revolution of the cam 66 causes the modification of the path of the tape and ends the cycle of operation of the motor 54 by causing another stud 65A to engage the end 64 of the plate 61, causing the plate to move longitudinally and open the switch 68 to cut off the supply to the motor 54.

With the tape located in the large loop 47, the drive spindles of the video apparatus in which the adapter is located are then operable to drive the spools 20A, 20B of the miniature cassette 16 via a gear train 76, 78 which causes the tape 24 of the miniature cassette 16 to be transferred from the take-off spool to the take-up spool of the miniature cassette, passing through the long path 47 in which it is held by the arms 52A, 52B and the guide means 46A, 46B. The drive connection between the spindles 38A, 38B of the video apparatus and the spools 20A, 20B of the miniature cassette includes the hubs 80A, 80B (FIG. 3) of the adapter, into which the video apparatus spindles are inserted, and the gear train 76, 78 which connects the hubs to the spools of the miniature cassette 16. The hubs 80A, 80B carry a ring gear 76 which meshes with an intermediate gear 78 which, in turn, meshes with a gear 82 fixed to the drive spindles 38A, 38B of the spools 20A, 20B of the miniature cassette. Thus, rotation of the hubs 80A, 80B rotates the gears 76, 78 and 82 to rotate the drive spindles for the spools of the miniature cassette. A similar gear train is provided for both spools of the miniature cassette, which are driven in opposite directions.

This causes tape to be transferred from the take-off spool to the take-up spool of the miniature cassette.

Removal of the Miniature Cassette from the Adapter:

The miniature cassette 16 is removable from the adapter 26 after the latter has been ejected from the video apparatus. For removal of a miniature cassette from the adapter, the arms 52A, 52B are retracted from their extended positions and the tape 24 is retracted from the large loop 47 to the small loop 25 within the miniature cassette 16. For this purpose, for example, the push-button switch 48 is operated, which causes the plate 61 to be pivoted, released from the stud 65A and urged by the spring 67 into engagement with the contact of switch 68. This closes the control circuit 58 and connects power to the motor 54. Operation of the motor 54 causes the cam 66 to rotate one-half revolution, at the end of which its cycle of operation is stopped by engagement of the other stud 65 with the plate 61, moving it longitudinally and opening the contact of switch 68. During the course of the one-half revolution of the cam 66, the tape of the miniature cassette is retracted from the large loop 47 to the small loop 25.

Since the retraction of the tape 24 within the miniature cassette 16 is caused during the inward retraction of the arms 52A, 52B, means are provided to utilize the inward movement of the arms 52A, 52B to retract the tape. For this purpose, a gear sector 88 is provided on the arm 52B and a similar gear sector (not shown) is also provided on the other arm 52A. These sectors 88 are connected to rotate the spools 20A, 20B of the miniature cassette 16 during the inward movement of the arms 52A, 52B and are disengaged so as not to rotate the spools 20A, 20B during the outward movements of the arms 52A, 52B. The spools 20A, 20B are rotated in the opposite directions such as to retract the tape into the miniature cassette 16.

To this end, an intermediate gear 90 is provided which is movable into and out of mesh with the gear sector 88, being mounted on a lever 92 which is pivotable about the axis 94 of a small pinion 96 with which the intermediate gear 90 meshes. The pinion 96, in turn, is frictionally coupled to the gear 78, which meshes with the gear 82 connected to the spool 20A of the miniature cassette 16. A similar gear train is provided between the sector associated with the arm 52B and the other spool 20B.

This intermediate gear 90 and the similar gear associated with the other sector are both either urged into mesh by a spring (not shown) or disengaged from the sectors 88.

To disengage the intermediate gear 90 from the sector 88, a large radius portion 66B of the cam 66 is operative through a cam follower 98 and link 100 to pivot the lever 92 in the direction away from the sector 88. The lever 92 has a pin 102 which is engaged by the curved end 104 of a link 106.

As shown in FIG. 4, during one-half revolution of the cam 66, while the arms 52A, 52B are being retracted inwardly, the small radius portion 66A of its periphery is contacted by the cam follower roller 98 on the link 100. During that half-revolution, the intermediate gear 90 is in mesh with the gear sector 88.

Figure 5:
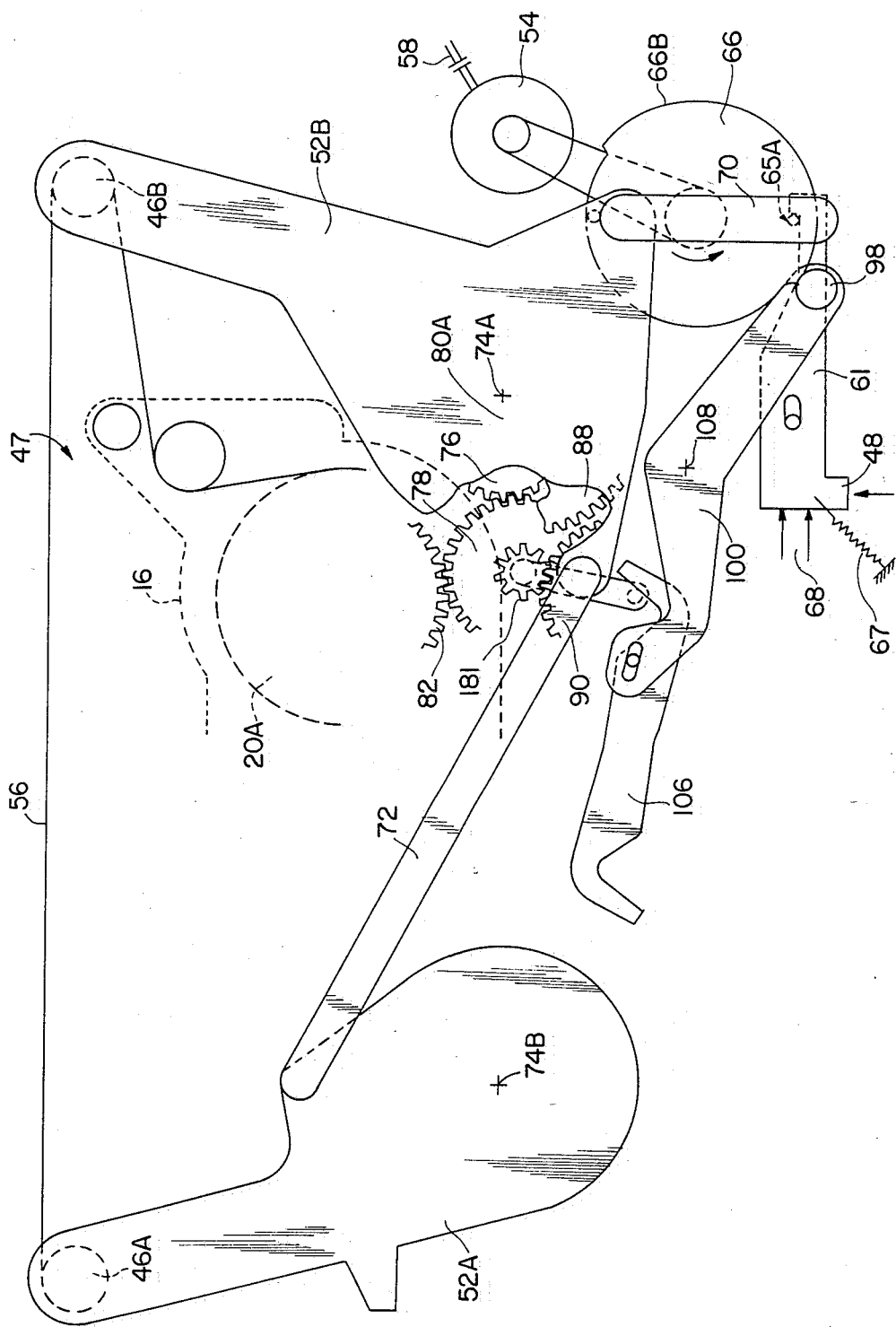
FIG. 5 is a fragmentary detail view similar to FIG. 4 and illustrating the arms and guide means in an extended postion.

During the other half-revolution of the cam 66, while the arms 52A, 52B are being moved outwardly, the large radius portion 66B of the cam 66 is contacted by the cam follower roller 98 as shown in FIG. 5, which pivots the follower link 100 clockwise about its support 108, causing the link 106 to be pivoted counterclockwise about its support 110. This counterclockwise movement of the link 106 through its curved end 104 engages the pin 102 on the lever 92 and shifts the lever 92 to the left in FIG. 5 to disengage the gear 90 from the sector 88 as shown in that Figure. The lever 106 is similarly curved on the opposite end 104A to cooperate with a similar link to the link 92 associated with the gear train connecting the arm 52A to the spool 20A.

The gear ratio between the sector 88 and the gear 82 on the spool 20A through the gear train, including gears 90, 76 and 78, is such as to rotate the spool 20A (and likewise the spool 20B in the opposite direction through the gear train driven from the other arm 52B) sufficiently to take up all the tape in the large loop with a sufficient safety margin such that any slack is also taken up and the tape is fully retracted into the miniature cassette 16 extending therefrom in its original small loop 25.

Safety Devices:

It is absolutely necessary for the arms 52A, 52B of the adapter 26 and the magnetic tape of the miniature cassette 16 to be located in the large loop path 47 of a normal cassette (FIG. 1) when the adapter is inserted in the video apparatus. Otherwise, the arms 52A, 52B would be disposed opposite elements of the video apparatus which they would damage (for example, devices for loading the tape or for automatic stoppage) if the adapter 26 were placed in the operative position in the apparatus.

It is, therefore, particularly necessary to insure that the tape of the miniature cassette 16 occupies the large loop path with a straight section of the elongated path 56 adjacent one edge of the adapter 26 and corresponding to that of a normal cassette before the adapter can be inserted into video apparatus, and also to insure that the push button switch 48 which, when actuated, starts the motor 54 for shifting the arms from one position to another, is disabled once the adapter 26 has been inserted into video apparatus.

In order to achieve these two requirements, two safety devices are provided, as shown in FIG. 3.

As in the case of normal cassettes, the adapter 26 includes a means which allows it to be inserted in video apparatus and facilitates its ejection. In the illustrated example, this means comprises slidable blocks 200A, 200B disposed on each side of the adapter and subject to the action of springs 201A, 201B which are supported on the housing 28 of the adapter 26. These blocks 200A, 200B cooperate with fixed elements which are mounted in the video apparatus such that, at the time of insertion into such apparatus, the blocks are moved backward against the action of the springs 201A, 201B so as to allow the adapter to be inserted.

These blocks 200A, 200B also serve with the springs 201A, 201B to push the adapter 26 out of the video apparatus housing at the time of ejection.

In order to insure that the adapter 26 cannot be inserted into a video apparatus unless the arms 52A, 52B are located in their extended positions, one of the blocks 200B is normally locked against movement and released when the arms are swung to their extended positions. For this purpose, a catch 210 is pivotally mounted about a spindle 211 and subject to the action of a return spring 212 which tends to position it in the path of the block 200B so as to prevent any displacement thereof. The arm 52A bears a lug 213 which engages a member 214 projecting from the catch 210 when the arm 52A reaches its extended position, as illustrated in dashed lines in FIG. 3 and solid lines in FIG. 5. Upon such engagement, the catch 210 is pivoted against its return spring 212 out of the path of the block 200B.

When the arm 52A moves inwardly, it disengages from the catch 210, which is subject to the action of its return spring 212 and pivots to the solid line position illustrated in FIG. 3 and into the path of the block 200B. In that position, it will prevent the adapter from being inserted in the housing of a video apparatus by inhibiting the backward movement of the block 200B.

The backward movement of the block 200B caused by cooperation with elements of the video apparatus, when the adapter is inserted, is also utilized to disable the circuit including the switch 48, thus insuring that the motor 54 cannot be operated when the adapter 26 is in a video apparatus. For this purpose the block 200B opens the switch 250 disposed in the supply circuit 58 (FIG. 7) when the adapter 26 is inserted in the video apparatus.

A safety device is also provided to prevent any movement of the arms 52A, 52B as long as the miniature video cassette 16 is not correctly positioned in the cavity 30 provided in the adapter. This safety device includes the switch 50, which is preferably disposed at the bottom of the cavity 30 and is actuated by the casing of the miniature video cassette 16 when the latter is fully inserted into the cavity and correctly positioned therein. The switch 50, arranged in the supply circuit of the motor 54 (FIG. 7), allows the motor 54 to be switched on only when the miniature cassette is correctly positioned in the adapter 26. It also can advantageously serve as an automatic means for extending the arms 52A, 52B and producing the large loop 47 of magnetic tape responsive to insertion of the miniature cassette 16 in the adapter by starting the motor 54 and cam 66 through their cycle of operation.

A further safety means is included to insure that the tape is not subjected to excessive tension when the arms 52A, 52B are retracted and the sack in the tape is taken up. For this purpose, the pinion 96 is frictionally coupled to the gear 78 of the gear train that rotates the cassette spools to take up the slack. When the slack is fully taken up, the gears 78, 76 can slip relatively, thus limiting the torque transmitted and the tension on the tape. Thus, while the gear ratio of the gear train that rotates the cassettes spools is set to more than take up slack under all positions of the spools, the frictional coupling prevents damage to the tape.

I claim:

1. A video cassette adapter comprising:
   a housing:
   means including walls defining a cavity in a face of said housing for receiving a miniature cassette having spools and recording tape extending therebetween normally in a small loop;
   guide means movably mounted in said housing and extendible outwardly to an extended position from a retracted position within said small loop for forming a large loop by drawing the recording from tape the spools of a miniature cassette in said cavity with a section of said large loop extending between said spools along a straight elongated path adjacent an edge of said housing and retractible from said extended position to said retracted position while said tape is retracted to the small loop;
   hubs rotatably mounted in said housing for access through a face thereof by and for cooperation with spindles of a video apparatus;
   means including an intermediate drive connecting said hubs to rotate said miniature cassette spools to transfer recording tape therebetween along said path;
   electric motor means in said housing connected to move said guide means between retracted and extended positions; and
   take-up means operated by said motor means as incident to retracting said guide means for also rotating a take-up spool of said miniature cassette to retract said recording tape and form a small loop.

2. An adapter according to claim 1 including control means for operating said motor means, and safety means for preventing said control means from operating said motor means to retract said guide means from the extended position when said adapter is in said video apparatus.

3. An adapter according to claim 2 in which said guide means are carried by a pair of pivotally mounted arms and said arms and guide means are movable between retracted and extended positions by said motor to engage said guide means and the recording tape of a miniature cassette for forming said large loop of said recording tape.

4. An adapter according to claim 1 in which said guide means are retracted from said extended position by said motor means and in which said take-up means includes engageable and disengageable drive means engageable for also rotating a take-up spool of said miniature cassette to retract said recording tape and form said small loop as said guide means are retracted.

5. An adapter according to claim 1 including control means operates said motor to move said arms and guide means responsive to insertion of a miniature cassette in said cavity of said housing.

6. An adapter according to claim 5 in which said activating means includes switch means actuated upon insertion of a miniature cassette in said cavity of said housing.

7. An adapter according to claim 4 in which a take-up spool of said miniature cassette is rotated by said take-up means to take-up the tape a distance greater than the difference between the large and small loops to insure that the tape is fully retracted.

8. An adapter according to claim 4 in which said guide means include pivotally mounted arms operated by said motor means.

9. An adapter according to claim 7 in which said take-up means comprises gear means connecting said arms and said take-up spool.

10. An adapter according to claim 9 in which said gear means includes intermediate gears shiftable into and out of engagement to rotate said take-up spool only during the retraction stroke of said arms.

11. An adapter according to claim 10 in which said gear means is connected to rotate said take-up spool and has a gear ratio such as to rotate the take-up spool sufficiently to take-up the tape the difference in distance between the large loop and the small loop with a sufficient safety margin such that any slack is also taken up to insure that the tape is fully retracted.

12. An adapter according to any of claims 1, 2, 4 through 11 including safety means comprising a moveable preventer element mounted on the adapter housing and having two states representing non-extended and extended positions of said guide means, respectively, and adapted in the first state for cooperation with means in a video apparatus to prevent the insertion of said housing in said video apparatus.

13. An adapter according to claim 12 in which said preventer element is movably mounted on said housing and said two states are a locked state and a released state, and means to change states includes a catch mounted in said housing, operated in response to movement of said guide means between retracted and extended positions to lock and release said preventer element according to the position of said guide means, said preventer element being locked in the extended position of said guide means.

14. An adapter according to any of claims 2, 13, and 12 in which said safety means comprises a slide on said housing which is adapted to be moved as an incident to inserting said adapter housing in a video apparatus, and switch means actuated by said slide to disable said motor means and prevent movement of said guide means when said adapter is in the video apparatus.

15. A video cassette adapter allowing a miniature cassette to be played in conventional video apparatus comprising:
- a housing having the outer shape and dimensions of a standard, large size video cassette;
- means in said housing defining a cavity for receiving a miniature cassette having spools and recording tape extending therebetween normally in a small loop;
- guide means movably mounted in said housing from a retracted position within said small loop of said recording tape, said guide means including rollers mounted on pivotable arms;
- electrical power operated motor means in said housing connected to extend said arms for forming and holding a large loop of the recording tape of a miniature cassette in said cavity around said guide means with a section of the large loop extending along a straight elongated path and to retract the arms and guide means to the retracted position, and to retract the tape to the small loop; and
- hubs rotatably mounted in said housing for access through a face thereof by and for cooperation with spindles of a video apparatus and connected to rotate said miniature cassette spools while said arms are extended and said guide means are holding the tape in the large loop to transfer recording tape along the path of the large loop.

16. A video cassette adapter comprising:
- a housing;
- means including walls defining a cavity in a face of said housing for receiving a miniature cassette having spools and recording tape extending therebetween normally in a small loop;
- guide means movably mounted in said housing and extendible outwardly to an extended position from a retracted position for forming a large loop by drawing the recording tape from spools of a miniature cassette in said cavity with a section of said large loop extending between said spools along a straight elongated path adjacent an edge of said housing;
- hubs rotatably mounted in said housing for access through a face thereof by and for cooperation with spindles of a video apparatus;
- means connecting said hubs to rotate said miniature cassette spools to transfer recording tape therebetween along said path;
- means actuable by a user for retracting said guide means from said extended position to said retracted position; and
- safety means carried by said adapter and movable into a disabling position effectively preventing the operation of said means actuable by a user responsive to inserting said adapter in a video apparatus for disabling said means actuable by a user from retracting said guide means when said adapter is in said video apparatus.

17. An adapter according to claim 16 in which said safety means includes means carried by the adapter housing and adapted for operation by means in a video apparatus upon inserting said adapter housing in said video apparatus for disabling said means actuable by a user.

18. An adapter according to claim 4 in which said engageable and disengageable drive means is engaged and disengaged according to the position of said guide means.

19. An adapter according to claim 4 in which said engageable and disengageable drive means is disengaged from said takeup spool as said guide means are extended to and remain in the extended position to allow the spools to be rotated by said hubs in both directions while the tape is in the large loop.

20. A video cassette adapter comprising:
- a housing
- means including walls defining a cavity in a face of said housing for receiving a miniature cassette having spools and recording tape extending therebetween normally in a small loop;
- guide means movably mounted in said housing and extendible outwardly to an extended position from a retracted position forming a large loop by drawing the recording tape from spools of a miniature cassette in said cavity with a section of said large loop extending between said spools along a straight elongated path adjacent an edge of said housing and retractible from said extended position to said retracted position while said tape is retracted to the small loop;
- hubs rotatably mounted in said housing for access through a face thereof by and for cooperation with spindles of a video apparatus;
- means connecting said hubs to rotate said miniature cassette spools to transfer recording tape therebetween along said path; and
- safety means including a moveable preventer element mounted on the adapter housing and having two states representing non-extended and extended positions of said guide means, respectively, and means operated in response to movement of said guide means between said positions to change states of said preventer element, said preventer element being adapted in the first of said states to cooperate with means in a video apparatus to prevent the insertion of said housing in the video apparatus.

21. An adapter according to claim 20 in which said preventer element projects from the adapter housing and has a fixed position in said first state adapted to cooperate with an element in said video apparatus to prevent the insertion of the adapter therein.

22. A video cassette adapter allowing a miniature cassette to be played in conventional video apparatus comprising:
- a housing having the outer shape and dimensions of a standard, large size video cassette;
- means in said housing defining a cavity for receiving a miniature cassette having spools and recording tape extending therebetween normally in a small loop;
- guide means in said housing for said recording tape, said guide means including rollers mounted on pivotable arms extendible from a retracted position within said small loop for forming and holding a large loop around said guide means with a section of the large loop extending along a straight elongated path and retractible to said retracted position;
- electrical power operated motor means in said housing connected to extend and retract said arms;
- hubs rotatably mounted in said housing for access through a face thereof by and for cooperation with spindles of a video apparatus and connected to rotate said miniature cassette spools while said arms and guide means are extended and holding the tape in the large loop to transfer recording tape along the path of the large loop; and means included in said housing adapted to cooperate with means in a video apparatus as an incident to inserting said adapter housing in the apparatus to disable said motor and prevent movement of said arms while said adapter housing is in said apparatus.

23. An adapter according to any of claims 7 or 11 including a slip coupling in said drive means to limit torque transmitted to retract the tape and avoid overtensioning the tape as it is being fully retracted.

24. A video cassette adapter comprising:

a housing;

means including walls defining a cavity in a face of said housing for receiving a miniature cassette having spools and recording tape extending therebetween normally in a small loop;

guide means movably mounted in said housing and extendible outwardly to an extended position from a retracted position within said small loop for forming a large loop by drawing the recording tape from the spools of a miniature cassette in said cavity with a section of said large loop extending between said spools along a straight elongated path adjacent an edge of said housing and retractible from said extended position to said retracted position while said tape is retracted to the small loop;

hubs rotatably mounted in said housing for access through a face thereof by and for cooperation with spindles of a video apparatus;

means including an intermediate drive connecting said hubs to rotate said miniature cassette spools to transfer recording tape therebetween along said path;

electric motor means in said housing connected to move said guide means between retracted and extended positions;

take-up means operated by said motor means as an incident to retracting said guide means for also rotating a take-up spool of said miniature cassette to retract said recording tape and form a small loop;

control means for operating said motor means to move said guide means;

means for activating said control means responsive to insertion of a miniature cassette in said cavity of said housing;

safety means comprises a movable preventer element mounted on the adapter housing and having two states representing non-extended and extended positions of said guide means, respectively, and adapted in the first state for cooperation with means in a video apparatus to prevent the insertion of said housing in said video apparatus;

safety means for preventing said control means from operating said motor means to retract said guide means from the extended position when said adapter is in said video apparatus; and engageable and disengageable drive means included in said take-up means engageable for also rotating a take-up spool of said miniature cassette to retract said recording tape and form said small loop as said guide means are retracted, said engageable and disengageable drive means being disengaged from said take-up spool as said guide means are extended to and remain in the extended position to allow the spools to be rotated by said hubs in both directions while the tape is in the large loop in the video apparatus, said drive means having a gear ratio such as to rotate the take-up spool sufficiently to take-up the tape the difference in distance between the large loop and the small loop with a sufficient safety margin such that any slack is also taken up to insure that the tape is fully retracted, and further having a slip coupling to limit the torque transmitted to avoid overtensioning the tape.

* * * * *